United States Patent Office 3,360,597
Patented Dec. 26, 1967

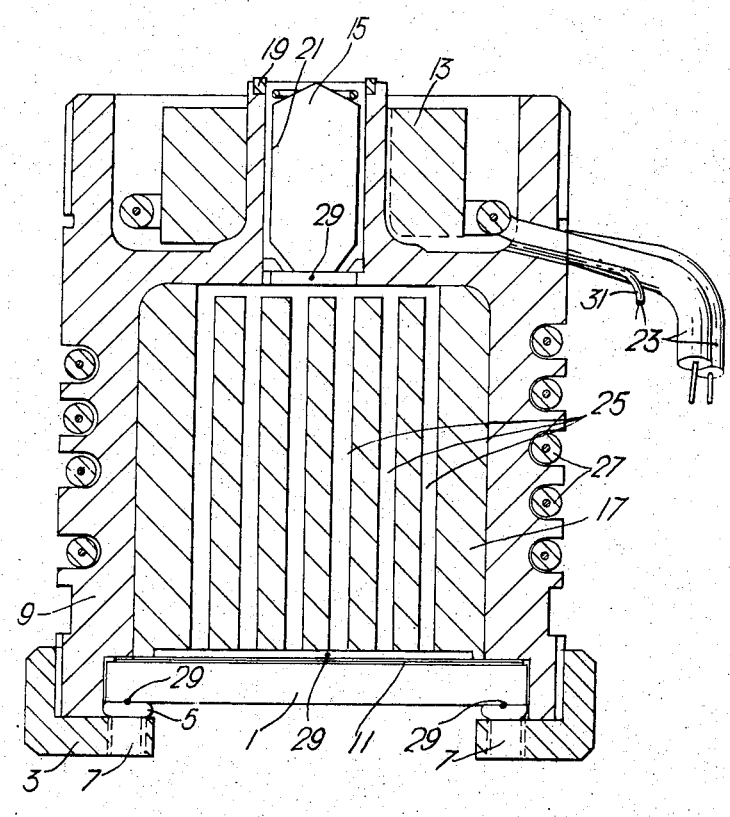

3,360,597
MELT-SPINNING OF SYNTHETIC
LINEAR POLYMERS
Dewi Madoc Jones, Abergavenny, and John K. B. Williams, St. Dials, Cwmbran, England, assignors to British Nylon Spinners Limited, Pontypool, England
Filed May 24, 1965, Ser. No. 458,335
Claims priority, application Great Britain, June 3, 1964, 22,887/64
6 Claims. (Cl. 264—176)

The invention is concerned with improvements in or relating to the melt-spinning of synthetic linear polymers.

Continuous filaments are melt-spun from synthetic linear polymer material by extruding the material in molten form through holes in a spinneret. It is standard practice in the art to force the molten material through a filter prior to such extrusion in order to homogenise the material, remove any gas bubbles and filter out any foreign bodies. Such a filter can be composed of sand particles or other similar particles that are inert to the synthetic polymer material in question; or, alternatively or in addition, the filter may be composed of porous or perforated metal plates.

It is a normal practice to melt already-made solid synthetic polymer material in a melter, and then to sustain a reservoir of the molten material of the minimum amount consonant with the continuous supply of such material for extrusion. There is an optimum temperature for melting, at which melting takes place at the greatest rate substantially without decomposition of the material; and there is an optimum temperature for extrusion, usually different from the temperature for melting, at which the filaments are freely spun from the holes of the spinneret and fairly rapidly thereafter cooled to the solid state.

Melt-spinning apparatus, therefore, has comprised a melter having means in it to raise the temperature of the synthetic polymer material to the required melting temperature, a chamber for sustaining a reservoir (melt pool) of molten material residing therein for a short duration, in which reservoir the material is maintained in molten condition, at least one meter pump for forwarding the molten material from the reservoir to a spinning head, the spinning head containing a filter pack and a spinneret. Separate heating means may be provided for the spinning head; or a platen heater may be provided for heating substantially only the spinneret itself, in either case to help control the temperature of extrusion accurately at the desired optimum value.

Heretofore, a filter pack of some kind, for the purposes enumerated above, has been deemed to be an essential element of melt-spinning apparatus; but it is, of course, a fact that its presence, apart altogether from the cost of its supply and of its assembly, is also an inherent drawback in the melt-spinning process for other sundry reasons. First of all, when, as is customary, it is composed of sand or other fine particulate filtration medium, the filter becomes either clogged or else channelled relatively quickly, and so the filter pack has only a limited "life" before it requires to be changed, with attendant interruption in the process. This is particularly the case with some pigmented polymers, when the pigment may be stripped from the polymer by the filtration medium. Secondly, particles from the filter may be forced out of it and taken into the spinneret holes, there to cause partial or complete blockage against the flow of the molten polymer. Thirdly, the pressure required to be exerted on the molten polymer to force it through the filter pack incidentally necessitates the use of thick plates for the spinnerets, and such plates present peculiar difficulty in regard to the fashioning of the holes therein, particularly when these holes are required to be of other than circular cross-section.

The present invention has proceeded on the hypothesis that the function of homogenising the melt, to eliminate inhomogeneities arising from the physical structure or morphology of the molten polymer, immediately prior to extrusion might be accomplished without a filter, or with a weaker filter than normal, by the application of heat at a temperature higher than that of melting and for a short duration. It was felt that if this hypothesis were to be proved correct, the benefits which would flow from such a substitution of heat for a normal filter would not be restricted to overcoming the disadvantages of the filter adumbrated above. The other benefits would be substantial, relating to the complex relationship between the temperature of the melt and the onset and nature of crystallization in a filament spun from the melt and then rapidly cooled.

It has been found that the higher the temperature of the melt pool and the longer the molten polymer is held at that temperature, up to the point at which cross-linking occurs, the longer will be the time interval before crystallization commences in the spun filaments at a given temperature of cooling. This is possibly due to the more complete melting of crystalline nuclei in the melt, which nuclei are normally present in solidified polymer, such as that of nylon 66. Reduction of the extent of crystallization that is allowed to occur in the cooling chimney positioned below the spinneret has been found to be of benefit in regard to the quality of the filaments spun from the melt and in regard to the lowering of the spun orientation (birefringence) of the filaments. The latter result is desirable from the point of view of the productivity of the entire melt-spinning and drawing process for producing yarns from synthetic polymers.

On the other hand, there are disadvantages in high melt pool temperatures and holding times, such disadvantages flowing from the extent of the degradation and gelation of the polymer material that occurs under such conditions leading to poor quality filaments and short durations of spinning from any given melt-spinning unit before it has to be taken out of operation for cleaning.

Thus if advantage could be taken of the brief period of travel of the molten polymer material between the meter pump and the spinneret to "flash heat" the polymer to a relatively high temperature, this might have a similar desirable result to that of the relatively lower but longer heating of the melt pool, but without the concomitant disadvantages associated with such latter extent of heating. Indeed, the temperature of the melt-pool, and that also of the spinneret at extrusion, might be able to be lowered from these normally employed, and hence even longer durations of spinning and better spinning performance achieved. Further, spinning could be allowed at a greater rate than normal without incurring off-lustre trouble.

As a result of experimentation, the above hypothesis has been found to be at least substantially correct, and the attendant consequences have been shown to be possibly attainable.

According to the invention, therefore, the improvement in the process of melt-spinning of synthetic linear polymeric material comprises the steps of melting the material, heating the material in molten condition for a short duration during a portion of its travel between the melting means and the spinneret, the temperature to which it is so subjected being substantially higher than that at which it was melted, and extruding the material through holes in the spinneret.

Preferably, the molten material is cooled subsequent to such heating but prior to extrusion.

In the case of polyhexamethylene adipamide, the temperature to which the molten polymer is subjected for, say 10 seconds in a tubular heater comprising a portion of the passage between the meter pump and the spinneret can be between 300° C. and 310° C., compared with a melter temperature of, say 287° C., the molten polymer being constrained to flow in a plurality of separate streams through the middle of the tubular heater. The filaments can be extruded at the normal temperature, for instance 285° C., or at a slightly lower temperature. In the latter case, at any rate, it is desirable to incorporate a cooler to act on the molten polymer just above the spinneret to control the extrusion temperature. Such cooler may take the form of a nest of tubes, inside which a coolant is circulated, and between which the streams of molten material emerging from the tubular heater pass. In addition, or alternatively, a platen heater surrounding the spinneret may serve to control the temperature of extrusion.

The above-mentioned heater may completely replace the filtration medium in the filter pack; or alternatively some form of filter, as for example a gauze filter, a perforated or porous plate filter, or a more permeable than normal, sand filter, may be used in conjunction with the heater and be positioned either in advance of or subsequent to the heater in the direction of polymer flow. In addition, a mixing pump may be employed to eliminate or minimise inhomogeneities arising from impurities in the synthetic polymer material as manufactured or as may arise due to degradation reactions during processing.

Preferably, the molten polymer material is collected in a small recess above the spinneret immediately prior to extrusion, in order that the supply of material to all the holes in the spinneret may be uniform.

The apparatus according to the invention, therefore, comprises a melt-spinning "head" containing a spinneret, a tubular heater positioned therein upstream of said spinneret, means for distributing a stream of molten polymeric material approaching said tubular heater into a thinner stream or streams adapted to pass through said heater, and, optionally, a cooler positioned to act on said molten polymeric material after it has emerged from the heater and before it is introduced into the holes of the spinneret.

Optionally, filter means may be included in said melt-spinning "head" and positioned either upstream or downstream of said tubular heater.

The means for distributing the stream of polymer into a thinner stream or streams can take the form for example of a distributor plate having the desired number of holes through it; or a solid body distributor within a polymer channel may be employed to spread the liquid polymer into a thin annuler stream.

The heater can be an electric one, or one heated by circulating gas or liquid, the former being preferred because of the greater simplicity of its connection to the source of supply should the apparatus be in the nature of the standard pack which is replaceable as an entity. Additional advantages of the invention relate to the melt-spinning of mass-coloured filaments and of heterofilaments.

In the former case, the absence of a strong filter pack reduces the tendency of the pigments to become separated from the polymer material.

In the latter case, the lack of shear due to the absence of a strong filter pack enables the extrusion of combinations of polymer streams to occur reproducibly with the manner of their initial combination. Thus, different streams of polymer type or different colours of the same or of different polymers may be combined in the melter, in the passageways to and from the pumps, in the pumps themselves or in the pack; and the combined streams can be extruded in the same condition as they were combined.

The invention will now be described with reference to the accompanying drawing, which is a vertical sectional view of one embodiment of part of apparatus according to the invention.

The part of the apparatus illustrated in the drawing is the part normally called the pack. According to the embodiment, however, there is no filtration medium present as there would be in the normal pack.

In the drawing, spinneret plate 1 is held tightly in place at the bottom of the pack by retaining ring 3 and by thrust ring 5. A number of grub screws 7, spaced around the inwardly-directed flange of retaining ring 3, are tightened against the lower side of thrust ring 5, to effect a liquid-tight seal with the lower part of casing 9 via the gasket of screen 11. This arrangement is the normal one for melt-spinning packs of the conventional sort.

The remainder of the pack within casing 9, however, consists of heater 13, melt distributor 15 and cooler 17.

The pack is screwed into a cavity within the melt block (there being normally at least two such spinning "heads" per block, supplied wtih molten polymer from a single melter). A liquid-tight seal with the supply duct is ensured by aluminium gasket 19. Aluminium distributor body 15 within the central channel 21 of tubular heater 13 spreads the on-coming stream of molten polymer into a thin annular stream, for the most uniform and immediate effect of the "flash" heat treatment. The heater 13 is an electric one in this instance, supplied by electric leads 23. A suitable type is one of 250 watts/110 volts power.

The "cooler" 17 of the pack consists of an aluminium block with a number of holes 25 bored through it. This cooler fills the space normally occupied by the filtration medium; and heater coils 27 maintain this part of the pack at the desired extrusion temperature. In other words, the cooler serves to reduce the temperature of the molten polymer from the high temperature to which it is quickly "flash" heated, back to the normal temperature for extrusion, and to do so as efficiently and uniformly as possible, so that all parts of the polymer are uniformly at the desired extrusion temperature by the time they are introduced into the holes (not shown) in the spinneret plate 1.

The temperature of the molten polymer at the critical points en route to extrusion is monitored by thermocouples 29, the supply lead 31, to only the upper one of which is shown in the drawing.

Although only polyhexamethylene adipamide has been instanced above, it is to be understood that the invention is equally applicable to other synthetic linear polyamides and to synthetic linear polyesters and melt-spinnable polypropylenes.

What we claim is:

1. A process for melt spinning synthetic linear polymeric material comprising the steps of
    (a) melting the material at a temperature below that at which cross linking occurs;
    (b) traveling the molten material to a spinneret;
    (c) flash heating the molten material for a short duration during a portion of its travel to the spinneret, the temperature to which it is so heated being higher than that at which it was melted but below decomposition temperatures;
    (d) cooling the molten material after flash heating but before extrusion to temperatures above the melting point of the material but below the cross linking temperatures; and
    (e) extruding the molten material through holes in a spinneret.

2. The process of claim 1 wherein the molten material prior to the flash heating of the molten material is distributed more thinly.

3. The process of claim 1 wherein the cooling of the molten material is conducted under conditions wherein the molten material is separated into a plurality of streams to attain more uniform and faster cooling.

4. A process for melt-spinning synthetic linear polyamide material comprising the steps of:
    (a) melting said polyamide material at a temperature in the range from the melting point of said polyamide to about 287° C.;

(b) traveling the molten polyamide material to a spinneret;
(c) flash heating said molten polyamide to a temperature between about 300° C. to about 310° C. during a portion of its travel to the spinneret;
(d) cooling the molten polyamide material after flash heating but before extrusion to temperatures in the range from the melting point of said polyamide material to about 285° C.; and
(e) extruding the molten material through holes in a spinneret.

5. The process of claim 4 wherein the molten polyamide material prior to the flash heating of the molten polyamide material is distributed more thinly.

6. The process of claim 4 wherein the cooling of the molten material is conducted under conditions wherein the molten polyamide material is separated into a plurality of streams to attain more uniform and faster cooling.

References Cited

UNITED STATES PATENTS

| | | | |
|---|---|---|---|
| 1,984,472 | 12/1934 | Friederich et al. | 18—8 |
| 2,947,598 | 8/1960 | Maragliano et al. | 264—176 |

FOREIGN PATENTS

| | | |
|---|---|---|
| 229,943 | 10/1958 | Australia. |
| 818,100 | 8/1959 | Great Britain. |
| 618,663 | 3/1961 | Italy. |

ALEXANDER H. BRODMERKEL, *Primary Examiner.*
J. H. WOO, *Assistant Examiner.*